C. A. MARIEN.
CUSHION TIRE WHEEL.
APPLICATION FILED FEB. 2, 1910.
979,869.
Patented Dec. 27, 1910.
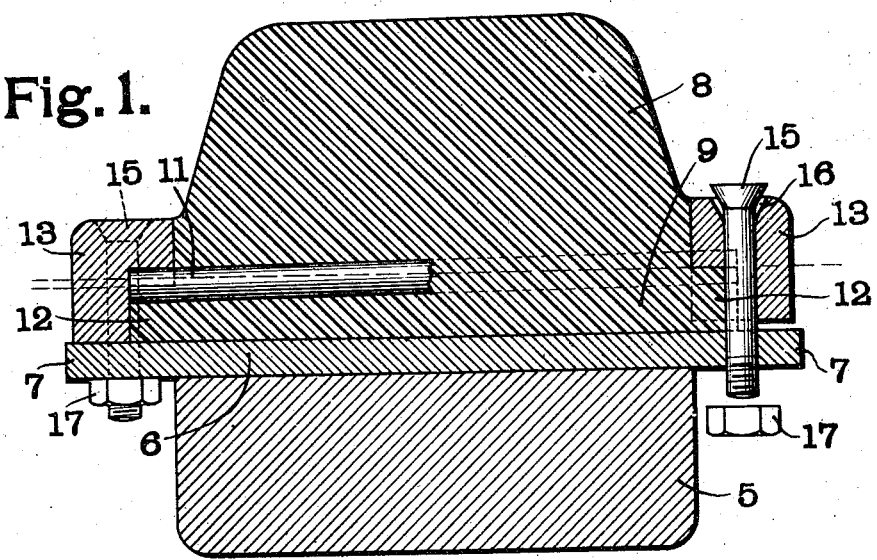
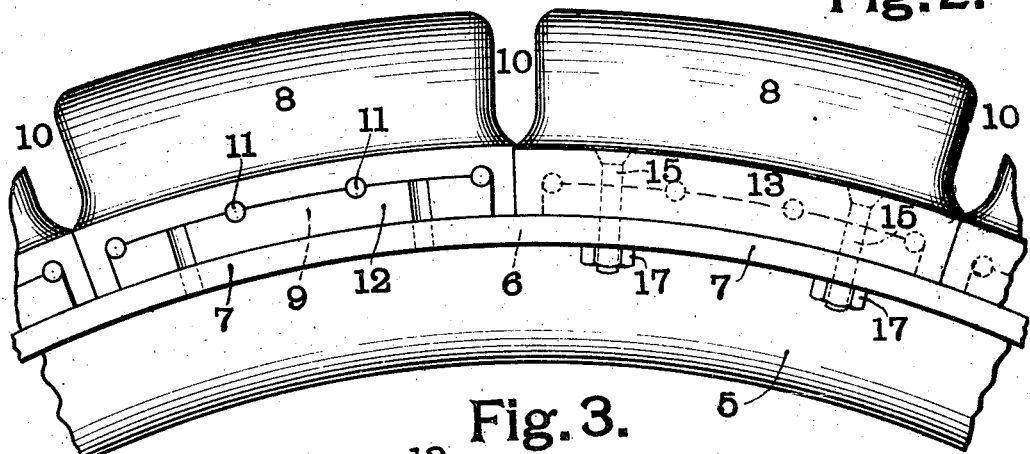
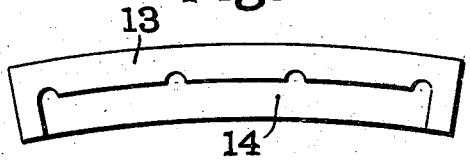
WITNESSES:
L. L. Mead.
W. A. Alexander.
INVENTOR.
Charles A. Marien
BY
Fawler & Huffman
ATTORNEYS

UNITED STATES PATENT OFFICE.

CHARLES A. MARIEN, OF ST. LOUIS, MISSOURI.

CUSHION-TIRE WHEEL.

979,869.

Specification of Letters Patent. Patented Dec. 27, 1910.

Application filed February 2, 1910. Serial No. 541,441.

*To all whom it may concern:*

Be it known that I, CHARLES A. MARIEN, a citizen of the United States, residing at St. Louis, Missouri, have invented a certain new and useful Cushion-Tire Wheel, of which the following is such a full, clear, and exact description as will enable any one skilled in the art to which it appertains to make and use the same, reference being had to the accompanying drawings, forming part of this specification.

My invention relates to a cushion tire wheel and more particularly to one in which the tire is made up of sections which may be separately removed from and attached to the wheel.

The object of my invention is to improve the manner of securing the sections to the wheel so that the construction will be simple and effective in operation.

In the accompanying drawings which illustrate one form of wheel made in accordance with my invention Figure 1 is a cross section; Fig. 2 is a side view and Fig. 3 is a detail view of one of the retaining members.

Like marks of reference refer to similar parts in the several views in the drawings.

5 represents the felly of the wheel which may be of the usual form and is preferably made of wood. Surrounding the felly 5 is the rim 6. The rim 6 differs from the usual rim in having its sides 7 project beyond the sides of the felly 5 as shown in Fig. 1. Seated on the rim 6 are the sections forming the tread of the tire. These sections are formed of rubber or other suitable resilient material and each consists of a body 8 and a base 9. The ends of the bodies 8 are somewhat shorter than the bases 9 so as to leave spaces 10 beyond the ends of the sections as shown in Fig. 2. These spaces 10 allow the material of the tire to flow as the tire is compressed and thus obviates the forming of a ridge in front of that portion of the tread which is in contact with the ground. Passing transversely through the sections of the tire are a number of rods 11. These rods project somewhat beyond the base of the sections and the base of each of the sections is provided with lateral projections 12 which form seats for the ends of the rods 11.

13 designates the retaining members. Each of these members 13 is provided with a pocket 14 adapted to receive one of the projections 12 of the base of the section and also the ends of the rods 11. The pockets 12 are slightly less in depth than the projections 12 of the bases of the sections as is shown at the right hand of Fig. 1. The retaining members 13 are secured in position by means of bolts 15 passing down through openings 16 in the retaining members 13 and through the projecting sides 7 of the rim 6. The bolts 15 are engaged by means of nuts 17. By tightening the nuts 17 the bolts 15 draw the retaining members 13 down so as to compress the base of the tire and hold it firmly in position against the rim as is shown in the right hand side of Fig. 1.

It will be seen that while my construction is simple it is very effective inasmuch as it holds the sections of the tire firmly against the rim so as to avoid any possibility of movement and the consequent working of the rods loose in the sections. Furthermore, the construction is such as to readily allow any section to be removed and a new section substituted without disturbing any of the remaining sections of the wheel. As each of the retaining devices is entirely independent of the others the tire may be firmly held in place even if the wheel becomes slightly deformed in shape as may often occur from long use.

Having fully described my invention, what I claim as new and desire to secure by Letters Patent of the United States is:

1. The combination with the rim of a wheel, of a tire of resilient material formed in sections, each of said sections being provided at its base with a pair of lateral projections, transverse rods passing through the base of each section, a pair of independent sets of sectional retaining members, one set arranged at each side of the tire, each of said retaining members being provided with a pocket closed at both ends and adapted to receive one of said projections, and means for removably securing said retaining members to the rim of the wheel.

2. The combination with the rim of a wheel, of a tire of resilient material formed in sections, each of said sections being provided at its base with a pair of lateral projections, transverse rods passing through the base of each section, a pair of independent sets of sectional retaining members, one set arranged at each side of the tire, each of said retaining members being provided with a pocket to receive one of said projections, said pockets having recesses in their upper parts to receive the ends of said transverse rods, and means for removably securing said retaining members to the rim of the wheel.

In testimony whereof, I have hereunto set my hand and affixed my seal in the presence of the two subscribing witnesses.

CHAS. A. MARIEN. [L. S.]

Witnesses:
W. A. ALEXANDER,
ELIZABETH BAILEY.